Figure 1:
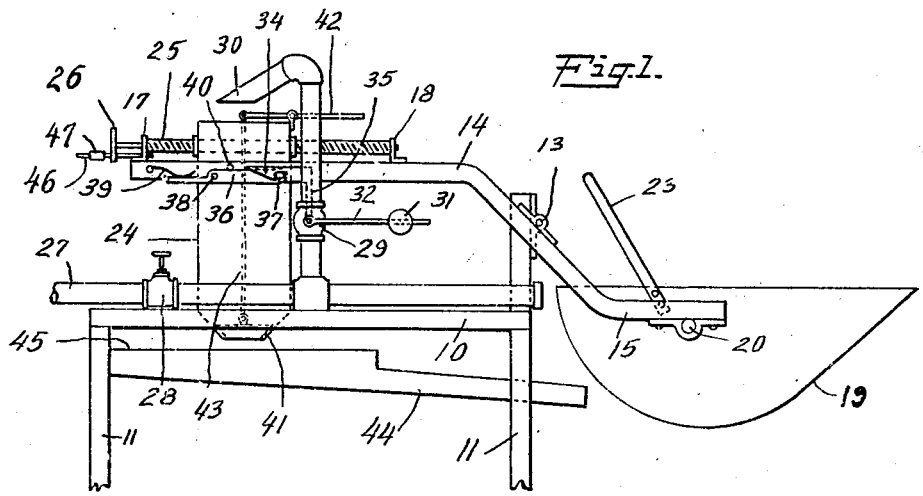

Jan. 24, 1928.

J. G. AHLERS 1,656,903

CONCRETE MAKING

Filed Dec. 26, 1925

INVENTOR
John G. Ahlers
BY
*his* ATTORNEYS

Patented Jan. 24, 1928.

1,656,903

UNITED STATES PATENT OFFICE.

JOHN GORDON AHLERS, OF NEW YORK, N. Y.

CONCRETE MAKING.

Application filed December 26, 1925. Serial No. 77,722.

This invention relates to the making of concrete for use in constructing buildings and other structures, and has for its object the provision of an improved method and apparatus for making concrete.

Concrete comprises a mixture of cement (usually Portland cement), water and aggregate materials, such for example as screened sand, gravel or crushed rock. Ever since concrete began to be extensively employed in building construction, there has been a controversy between the architect and the contractor concerning the strength of the concrete, there always being a tendency on the part of the contractor to reduce the quantity of cement in relation to the quantity of aggregate material so as to secure a large "yield", or in other words, for the sake of economy. On the other hand, the architect or designer of the building must be assured that the concrete will have the required strength.

As the result of a series of extended investigations carried on by the Lewis Institute, it has been established that the strength of concrete may be controlled within narrow limits by employing what has come to be known as the "water ratio theory". According to this theory, the strength of concrete is determined by the ratio of the amount of water to the amount of cement, the quantity of aggregate material employed being relatively unimportant as long as the resulting mixture is workable. In other words, assuming that the aggregates are clean and made up of sound, durable particles, and that, for example, 1 cubic foot of water is used for each cubic foot of cement, the strength of the concrete mixture at a given age is fixed regardless of the amount of the aggregate used, so long as the mixture is plastic and workable.

This water ratio theory has given highly desirable results as long as the process was manipulated by skilled engineers who were capable of accurately measuring the quantity of cement and water, but the problem is to provide a method of feeding the cement and water to the concrete mixing apparatus, and a mechanism for controlling the feeding or supply of cement and water to the mixer which can be placed in the hands of unskilled operators. That is, the problem is to provide a method and a mechanism which when placed in the hands of unskilled operators will insure to a large degree that the concrete mix produced by the mixing apparatus will have the proper proportions, or in other words, will be mixed in accordance with the water ratio theory.

In adapting to practice the water ratio theory, it is necessary that the quantity of water and the quantity of cement be accurately measured either by weight or by volume. To provide for the accurate measurement of these materials in a commercially practicable manner is however a difficult problem. The feeding of the three ingredients, namely, water, cement and aggregate material to the concrete mixer is necessarily entrusted to the hands of unskilled laborers who do not appreciate the importance of accurate mixing and the wide variation in strength which results from using improper proportions of the materials. Considerable pressure is sometimes brought to bear upon the operators to reduce the amount of cement used and heretofore no satisfactory method of making concrete has been known, by the employment of which the persons interested in securing a uniform strength could be reasonably certain of having the proper amounts of the various materials actually used.

These difficulties are to a large extent overcome by the present invention which involves the water ratio theory above referred to and through which the amount of cement is fed to the concrete mixing apparatus is utilized for controlling the amount of water supplied to the apparatus. According to the invention an appropriate amount of cement for a given batch of concrete is introduced into a solids receptacle which is operatively associated with a balance. Water is supplied to a liquid receptacle operatively arranged to balance the solids receptacle, and the supply of water automatically interrupted when the contents of the two receptacles attain a predetermined ratio of water to cement. When the supply of water has been automatically cut off, the contents of the two receptacles are discharged into the concrete mixing apparatus into which aggregate material, such for example as sand, pebbles or crushed rock, or a combination of these materials, is fed. This aggregate material is added until the desired workability or plasticity of the mixture is obtained. Other factors may have an influence upon the amount of aggregate used but aggregate may be added as long as the resulting mixture remains sufficiently plastic to be workable so that it will flow into the forms or moulds provided for it.

By the practice of the invention the operators are required to dump the bags of cement into the receptacle on the balance instead of directly into the mouth of the concrete mixer, as is customary. Then, in place of throwing a few bucketfuls of water into the mixer, or allowing a hose to play in the mouth of the mixer for an indeterminate and always varying length of time, the water is introduced into the mixer by way of the balance in amount determined by the amount of cement. Thus the amount of water is controlled by the amount of cement used.

By making concrete in accordance with the present invention, not only is the strength of the concrete at a given age definitely fixed theoretically, but one of the most important advantages of the invention is the fact that it provides in a commercially practical way a method of insuring that each batch of concrete is properly mixed. The fact that the operators of the concrete mixer have to dump the cement into the hopper of the balance and then wait for the shut-off device to operate to cut off the water has been found in practice to be an extremely effective means of compelling the proper amounts of cement and water to be introduced into each batch of concrete. On the other hand, if the bags of cement are dumped directly into the concrete mixer, and the water either weighed or measured by volume, an opportunity is easily afforded for too much or too little cement to be used and for a greater or less amount of water to be added.

Ordinarily the arrangement of the apparatus provides for automatically interrupting the supply of water although, if desired, the apparatus may be arranged to automatically cut off the supply of dry cement.

Figure 2:
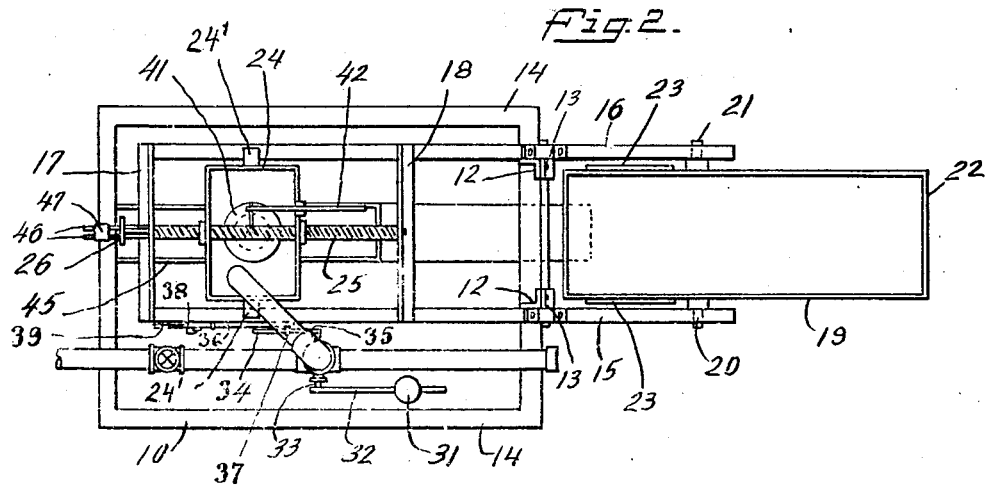
Figure 3:
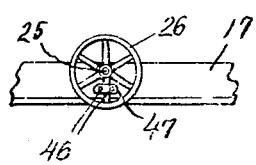

The apparatus adapted for carrying out the invention is illustrated in the accompanying drawings, in which Fig. 1 is a side elevation, Fig. 2 is a plan view, and Fig. 3 is a detailed view of the mechanism for locking the liquid receptacle in adjusted position.

Referring to these drawings, a rectangular frame-work 10, say for example of suitable steel shapes, having feet 11 supports the various associated parts. At the right hand end of frame-work 10 there are a pair of uprights 12 which conveniently are made as extensions of the right hand feet 11 and which are provided with pivotal or knife edge supports 13 for a balance beam 14. This balance beam 14 comprises a pair of spaced longitudinal members 15 and 16 preferably of S form, as shown in Fig. 1 with the right hand end lower than the left hand end. These longitudinal members 15 and 16 are joined by lateral struts 17 and 18.

At the right hand of the balance beam there is a solids receptacle or hopper 19 pivotally secured to the side members 15 and 16 at 20 and 21 respectively. This hopper is adapted to receive cement and is equipped with a spout 22 by which the cement can be dumped into the mixing apparatus at the proper time by rotating the hopper about its pivots with the aid of the handles 23.

To the left the balance beam 14 carries a liquid receptable 24 which is adjustable thereon through the action of the screw 25 which is rotatably mounted in the lateral struts 17 and 18. The turning of this screw by means of its handle 26 serves to adjust the distance of the receptacle 24 from the balance pivots 13. It will be noted, however, that the distance between balance pivots 13 and the pivots 20 and 21 of the solids receptacle 19 is not adjustable and always remains fixed. The liquid receptacle 24 may be locked in any position to which it has been adjusted by means of the mechanism shown in Fig. 3. In this mechanism a U-bolt 46 passes through suitable apertures in the strut 17 directly opposite the handle 26 and engages one of the spokes of this handle. A lock 47, preferably of the Yale type, is secured in position on the outer ends of the U-bolt. The U-bolt closely engages the apertures in strut 17 and prevents any appreciable movement of handle 26 in either direction.

Water is supplied to the liquid receptacle 24 through the pipe 27, shut-off valve 28, automatic valve 29 and spout 30. Automatic valve 29 is biased to the closed position by means of a weight 31 carried by an arm 32 that is secured to shaft 33 of the rotatable member of the valve. In the position shown in the drawings, valve 29 is open and it is held in this position by means of a suitable latch mechanism. This mechanism includes a hook 34 also rigidly secured to shaft 33 of the valve 29 and so mounted thereon by means of the L-shaped arm 35 that, when the valve is in the open position, hook 34 occupies a horizontal position parallel to but slightly spaced laterally from the horizontal left hand portion of side member 15 of the balance beam. In the closed position of valve 29 arm 32 is moved to approximately the vertical position by weight 31, and L-shaped arm 35 and hook 34 moved to the right through an angle of approximately 90°.

The valve 29 is held open by the engagement of the left hand vertical wall of the notch of hook 34 with a latch pin 37. Latch pin 37 is associated with frame member 15 being carried upon a pivoted member 36 which is pivoted at 38 to the outside of member 15. A spring 39 attached to member 15 bears upon the pivoted member 36 to the left of pivot 38 and hence urges the right hand portion of pivoted member 36 upwardly against a stop 40, thus determining the normal position of latch pin 37.

Latch pin 37 is mounted upon the pivoted member 36 so as to permit valve 29 to be conveniently and quickly latched in the open position. When it is desired to open valve 29 and start the flow of water into receptacle 24, arm 32 is moved upwardly from the vertical or closed position, thereby rotating valve shaft 33, L-shaped arm 36 and hook 34 to the left or in the counter clock-wise direction. As arm 32 and hook 34 approach the positions shown in Fig. 1 the sloping face of hook 34 slidingly engages latch pin 37, thus depressing latch pin 37 and pivoted arm 36 against the action of spring 39. When arm 32 reaches the wide-open position, latch pin 37 snaps upwardly into the notch of hook 34 and holds the valve in the open position.

With the parts as shown in the drawings, water flows into receptacle 24, but only so long as the weight in cement receptacle 19 is heavier than that in receptacle 24 does latch pin 37 hold valve 29 open. As soon as the water in receptacle 24 overbalances the weight in receptacle 19, the left hand portion of balance beam 14 moves downwardly and carries pivoted member 36 and latch pin 37 with it. Latch pin 37 is thus moved out of the slot of hook 34 allowing weight 31 to descend and close the valve. When the balance has been emptied of its solid and liquid materials and the balance beam 14 returns to the horizontal position, then if arm 32 is again rotated upwardly to the position shown in Fig. 1, latch pin 37 will be depressed as above described, and snap into the notch of hook 34 to hold the valve open. By means of this latch mechanism the operation of the balance is made convenient and expeditious.

In order to discharge the water from receptacle 24 a valve 41 is arranged to close an opening in the bottom of the receptacle and the valve is lifted by hand by the pivoted lever 42 connected thereto by the link 43. The water thus released is discharged into a conduit 44 which leads over to the right hand end of the apparatus so that both the water and the cement may be discharged at approximately the same point into the mouth of the concrete mixer. In order to provide for the adjustment of receptacle 24 along the balance arm 14, conduit 44 has an elongated opening 45 so as to receive the liquid from the valve 41 at any position of the receptacle upon the beam.

In employing this apparatus to carry out the process of the present invention, it is first necessary to determine the proper water ratio which should be used for the particular job. The proper ratio of water to cement to produce the strength of concrete which is desired will depend upon the quality of the cement and upon the kind and the cleanliness of the aggregate. The appropriate ratio which should be used is determined by breaking test specimens of concrete made from the materials to be employed. It has been found from practice that a water-cement ratio of approximately 1.0 will give the required strength in a great many cases. It is customary to calculate this water-cement ratio on the basis of volume of water to volume of cement. In other words a water-cement ratio of 1 is obtained by the use of 1 cubic foot or 7½ gallons of water to one bag of cement which in the United States weighs 94 pounds.

It is also necessary to determine the amount of moisture which is present in the aggregate material that is to be used and this can be readily done by drying and cooling representative samples of the aggregate, weighing the same before and after the drying operation.

The apparatus is set up in the vicinity of a concrete mixer of any appropriate form and arranged so that the hopper 19 can be conveniently dumped into the mouth of the mixer, and so that conduit 44 will discharge into this mouth. The total quantity of concrete which the concrete mixer will handle at one batch is of course known. Let us assume that the job is using a one-half yard mixer. Two bags of cement will therefore be used per batch. Let us also assume that the proper water-cement ratio to give the desired strength is 1.05, or in other words, 1.05 cubic feet of water for every bag of cement. Two bags of cement will therefore require 2.10 cubic feet of water, or 15.75 gallons. Further, let us assume that the test of the aggregate showed it to contain 3% of moisture by weight. For a one-half yard mixer the average batch will require 1300 pounds of aggregate and 3% of this amounts to 39 pounds, or 4.8 gallons of water. Deducting this from 15.75, we find that we should mix 11.6 gallons with each 2 bags of cement for each batch of concrete.

For convenience the water receptacle 24 is provided with a scale graduated to ¼ gallons. This tank in now filled with 11.6 gallons of water and 2 bags of cement are placed in the hopper 19. Then the handle 26 is turned so as to adjust the receptacle 24 by means of screw 25 to the proper distance from the balance pivots 13. This distance is determined by turning the screw until the weight of receptacle 24 just causes the left hand end of balance beam 14 to descend and release the hook 34 of the automatic valve 29.

In this way the proper setting of the apparatus is made and the water and cement may be dumped into the concrete mixer by operating handles 42 and 23. An appropriate amount of aggregate material is now fed to the mixer, this amount being kept within such limits as will produce a workable resulting mixture of concrete. Thus the first batch is mixed. The job can now proceed by putting successive batches of cement into the hopper 19, opening valve 29, letting the balance operate automatically to shut off the water, and discharging the cement and water into the mixer.

It is necessary to make daily checks of the amount of moisture in the aggregate material, but this variation can readily be compensated for by varying the position of receptacle 24 by means of screw 25. The engineer or inspector can make these tests of the aggregate material for moisture, and then set and lock the handle 26 accurately, and he may be reasonably certain that the concrete will continue to be mixed in accordance with this setting, and therefore that the concrete will have its required strength.

In order to particularly point out one of the advantages of the present method of mixing concrete, let us assume that the operator in charge of dumping cement into the hopper 19 either intentionally or unintentionally places less than 2 bags of cement in the hopper. Then in the accustomed way the valve 29 is opened and water allowed to flow into the liquid receptacle 24. The balance will automatically cut off the supply of water earlier than usual but at the time when the proper amount of water for mixing with the reduced amount of cement has been received in receptacle 24. It is true that we now have both a smaller amount of cement and a smaller amount of water which is to be introduced into the concrete mixer. Hence a smaller amount of aggregate material should be used for this batch. If the operators do not themselves notice that the water has cut off at an earlier point in time to reduce the quantity of aggregate material introduced into the mixer, the mistake will be automatically taken care of because if the excess of aggregate material for the cement and water is too great, the resulting concrete mixture will be unworkable and will either have to be rejected or additional cement and water added thereto.

It will be remembered that the present invention provides for the supplying of the cement and water to the concrete mixing apparatus through an intermediate apparatus which provides for the balancing of each batch of cement against the proper amount of water to be used with that cement and that the cement has to be fed to the balancing apparatus by the operators rather than to the concrete mixer. Water is also fed to the balancing apparatus rather than to the concrete mixer and the supply of water is automatically cut off when the proper amount of the cement has been received. In this way the supply of water to the concrete mixer is controlled by the quantity of cement supplied to the mixer.

Because of the fact that the operators ordinarily employed in the concrete mixing operation are taught to introduce the cement and water into the concrete mixer through the balancing apparatus, the proper amounts of cement and water for each batch, according to the size of the concrete mixer employed, are fixed. Inasmuch as the operators must place a certain amount of cement in the hopper of the balance and that if a less amount than that required for a full charge of the mixer is put in the balance, the correct amount of water for that reduced amount of cement will be automatically provided, which renders this method particularly practicable commercially.

When the present method of making concrete is employed, both the contractor and the designer of the building are placed in a more satisfactory position because the contractor is assured that the minimum amount of cement is being used, and the designer feels confident that the concrete will have the required strength.

I claim:

1. A device for controlling the supply of cement and water to a concrete mixing apparatus comprising a receptacle for cement, a container for water, a valve controlled conduit for supplying water to said container, and means for closing said valve when an amount of water proportional to an amount of cement placed in said receptacle has been received in said container, and means for discharging the contents of said receptacle and said container into the concrete mixing apparatus.

2. A device for controlling the supply of cement and water to a concrete mixing apparatus comprising receptacles respectively for cement and for water operatively associated with a common balancing means, a valve controlled conduit for supplying water to the water receptacle, means controlled by the balancing means for closing said valve when said receptacles reach a balanced relationship providing a predetermined ratio of water to cement, and means for discharging the contents of said receptacles into the concrete mixing apparatus.

3. A device for controlling the supply of cement and water to a concrete mixing apparatus comprising receptacles respectively for cement and for water operatively associated with a balancing mechanism, a valve controlled conduit for supplying water to the water receptacle, means controlled by the balancing mechanism for closing said valve when said receptacles reach a balanced relationship providing a predetermined ratio of water to cement, means for adjusting said balancing mechanism so as to vary the ratio of water to cement, means for locking the adjusting device in any desired position, and means for discharging the contents of said receptacles into the concrete mixing apparatus.

4. A device for controlling the supply of cement and water to a concrete mixing apparatus comprising receptacles respectively for cement and for water operatively associated with a pivoted balance arm, a valve controlled conduit for supplying water to the water receptacle, means controlled by the movement of the balance arm for closing said valve when said receptacles reach a balanced relationship providing a predetermined ratio of water to cement, means for adjusting one of said receptacles on the balance arm so as to vary said predetermined ratio, means for locking said receptacle in any desired position, and means for discharging the contents of said receptacles into the concrete mixing apparatus.

5. In an apparatus for mixing cement and water, a pivoted balance arm comprising two spaced substantially parallel members, a hopper pivotally mounted between said members on one side of the balance pivot, a liquid receptacle carried between said members on the opposite side of the balance pivot, and means for sliding said receptacle longitudinally of said members.

6. In an apparatus for mixing cement and water, a pivoted balance arm comprising two spaced substantially parallel members, a hopper pivotally mounted between said members on one side of the balance pivot, a liquid receptacle carried between said members on the opposite side of the balance pivot, means for sliding said receptacle longitudinally of said members, and means for discharging the contents of both of said receptacles substantially at the same point.

7. In an apparatus for mixing cement and water for making concrete, a pivotally mounted balance arm carrying a receptacle for cement at one side of the balance pivot, and a receptacle for water at the opposite side of the balance pivot, said liquid receptacle being slidable along said balance arm so as to vary the ratio of cement to water, an outlet for the liquid in said liquid receptacle, and a stationary longitudinally arranged trough cooperating with the outlet for receiving the liquid therefrom at any position of said receptacle on the balance arm and conveying said liquid in proximity to the cement receptacle.

8. A device for controlling the supply of cement and water to a concrete mixing apparatus comprising receptacles respectively for cement and for water operatively associated with a common balancing mechanism, a valve-controlled conduit for supplying water to the water receptacle, means controlled by the balancing mechanism for closing said valve when said receptacles reach a balanced relationship providing a predetermined ratio of water to cement, means for adjusting said balancing mechanism so as to vary the ratio of water to cement, and means for discharging the contents of said receptacles into the concrete mixing apparatus.

9. A device for controlling the supply of cement and water to a concrete mixing apparatus comprising receptacles respectively for cement and for water operatively associated with a pivoted balance arm, a valve-controlled conduit for supplying water to the water receptacle, means controlled by the movement of the balance arm for closing said valve when said receptacles reach a balanced relationship providing a predetermined ratio of water to cement, means for adjusting one of said receptacles on the balance arm so as to vary said predetermined ratio, and means for discharging the contents of said receptacles into the concrete mixing apparatus.

In testimony whereof I affix my signature.

JOHN GORDON AHLERS.